(12) United States Patent
Ishikawa et al.

(10) Patent No.: US 10,209,576 B2
(45) Date of Patent: Feb. 19, 2019

(54) LIQUID CRYSTAL DISPLAY DEVICE AND MOTHER SUBSTRATE THEREOF

(71) Applicant: Japan Display Inc., Tokyo (JP)

(72) Inventors: Tomokazu Ishikawa, Tokyo (JP); Yuki Kuramoto, Tokyo (JP); Hitomi Hasegawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 38 days.

(21) Appl. No.: 15/450,405

(22) Filed: Mar. 6, 2017

(65) Prior Publication Data

US 2017/0269404 A1 Sep. 21, 2017

(30) Foreign Application Priority Data

Mar. 18, 2016 (JP) .................................. 2016-055280

(51) Int. Cl.
*G02F 1/1333* (2006.01)
*G02F 1/1335* (2006.01)
*G02F 1/1339* (2006.01)
*G02F 1/1345* (2006.01)
*G02F 1/1368* (2006.01)

(52) U.S. Cl.
CPC .......... *G02F 1/1339* (2013.01); *G02F 1/1368* (2013.01); *G02F 1/13394* (2013.01); *G02F 1/13458* (2013.01); *G02F 1/133345* (2013.01); *G02F 1/133351* (2013.01); *G02F 1/133514* (2013.01)

(58) Field of Classification Search
CPC ..................................................... G02F 1/1339
See application file for complete search history.

(56) References Cited

U.S. PATENT DOCUMENTS

| 5,317,434 | A | * | 5/1994 | Ohara | G02F 1/1337 349/106 |
| 2007/0085965 | A1 | * | 4/2007 | Manabe | G02F 1/1339 349/155 |
| 2013/0027854 | A1 | * | 1/2013 | Nakamura | G02B 6/08 361/679.01 |

FOREIGN PATENT DOCUMENTS

WO 2011/132445 A1 10/2011

* cited by examiner

*Primary Examiner* — Lucy P Chien
(74) *Attorney, Agent, or Firm* — Typha IP LLC

(57) ABSTRACT

An object of this invention is to increase the number of liquid crystal display panels obtained from a mother substrate. There is provided a liquid crystal display device including a TFT substrate and a counter substrate bonded together by a seal portion formed along the periphery of the counter substrate, the TFT substrate having a terminal area formed in a portion thereof not opposed to the counter substrate. The TFT substrate has a bank-like organic passivation film formed along the edge of the terminal area. A stepped part is formed on the organic passivation film. The film thickness of the organic passivation film on the edge side of the stepped part is greater than the film thickness inside the stepped part.

11 Claims, 15 Drawing Sheets

LIQUID CRYSTAL DISPLAY DEVICE AND MOTHER SUBSTRATE THEREOF

CLAIM OF PRIORITY

The present application claims priority from Japanese Patent Application JP 2016-55280 filed on Mar. 18, 2016, the content of which is hereby incorporated by reference into this application.

BACKGROUND OF THE INVENTION

1. Field of the Invention

The present invention relates to a display device. More particularly, the invention relates to techniques for obtaining as many liquid crystal display panels as possible from a mother substrate.

2. Description of the Related Art

Liquid crystal display devices are each constituted by a thin-film transistor (TFT) substrate and a counter substrate disposed opposite thereto. The TFT substrate has pixel electrodes and TFTs formed thereon in a matrix pattern. The TFT substrate and the counter substrate have liquid crystal sandwiched therebetween. The light transmittance of liquid crystal molecules is controlled per pixel in order to form images.

It is not efficient to manufacture liquid crystal display panels one at a time. Instead, it is general practice to form numerous liquid crystal display panels on a mother substrate and, with the mother substrate finished, to cleave the individual liquid crystal display panels from the mother substrate. The mother substrate is first scribed along cleavage lines and then cleaved by impact into the individual liquid crystal display panels.

Patent Literature WO2011/132445 describes techniques for cleaving individual liquid crystal display panels from a mother substrate.

SUMMARY OF THE INVENTION

Obtaining numerous liquid crystal display panels from a single mother substrate helps reduce the manufacturing cost of the liquid crystal display panels. In order to cleave as many liquid crystal display panels as possible from the mother substrate, it is ideal to eliminate any gap between the liquid crystal display panels on the mother substrate.

Meanwhile, there is a strong need to maximize the display area of the liquid crystal display device while keeping its external size to predetermined dimensions. To satisfy this need requires minimizing the frame width of the device as well as the planar dimension of its terminal area. In the terminal area, the terminals are formed to supply power and signals to the liquid crystal display panel. With the liquid crystal display panels still on the mother substrate, the seal material or alignment film of a liquid crystal display panel could overflow and invade the terminal area of an adjacent liquid crystal display panel. If that happens, the terminals of the invaded liquid crystal display panel are vulnerable to bad connection.

Also, the higher the resolution of the screen becomes, the smaller the pitch of the terminals. An indium tin oxide (ITO) film is formed to cover the metal of the terminals. The ITO film is patterned by photolithography. If ITO residues result from the patterning, they can lead to short-circuiting between terminals.

It is therefore an object of the present invention to solve the above problems and provide techniques for obtaining as many liquid crystal display panels as possible from a mother substrate while maintaining the reliability of a liquid crystal display device carrying any of these liquid crystal display panels.

Means for Solving the Problems

The present invention proposes solving the above-described problems using the typical means outlined below.

According to one embodiment of the present invention, there is provided a liquid crystal display device including a TFT substrate and a counter substrate, the TFT substrate and the counter substrate being bonded together by a seal portion formed along the periphery of the counter substrate, the TFT substrate having a terminal area formed in a portion thereof not opposed to the counter substrate. The TFT substrate has a bank-like organic passivation film formed along an edge part of the terminal area. A stepped part is formed on the organic passivation film. The film thickness of the organic passivation film on the terminal area side of the stepped part is greater than the film thickness inside the stepped part.

According to another embodiment of the present invention, there is provided a liquid crystal display device including a TFT substrate having an organic passivation film and a counter substrate, the TFT substrate and the counter substrate being bonded together by a seal portion formed along the periphery of the counter substrate, the TFT substrate having a terminal area formed in a portion thereof not opposed to the counter substrate, the seal portion surrounding a region constituting a display area. The counter substrate has a bank-like spacer formed along an edge part thereof on the opposite side of the terminal area. The bank-like spacer has a first part and a second part, the first part having a first film thickness along the edge part, the second part being inside the first part and having a second film thickness greater than the first film thickness. The TFT substrate has a first bank-like organic passivation film formed at a position corresponding to the bank-like spacer. The tip of the first bank-like organic passivation film is opposed to the first part of the bank-like spacer.

DESCRIPTION OF THE PREFERRED EMBODIMENTS

The present invention is described below in detail using some preferred embodiments.

Embodiment 1

Figure 1:
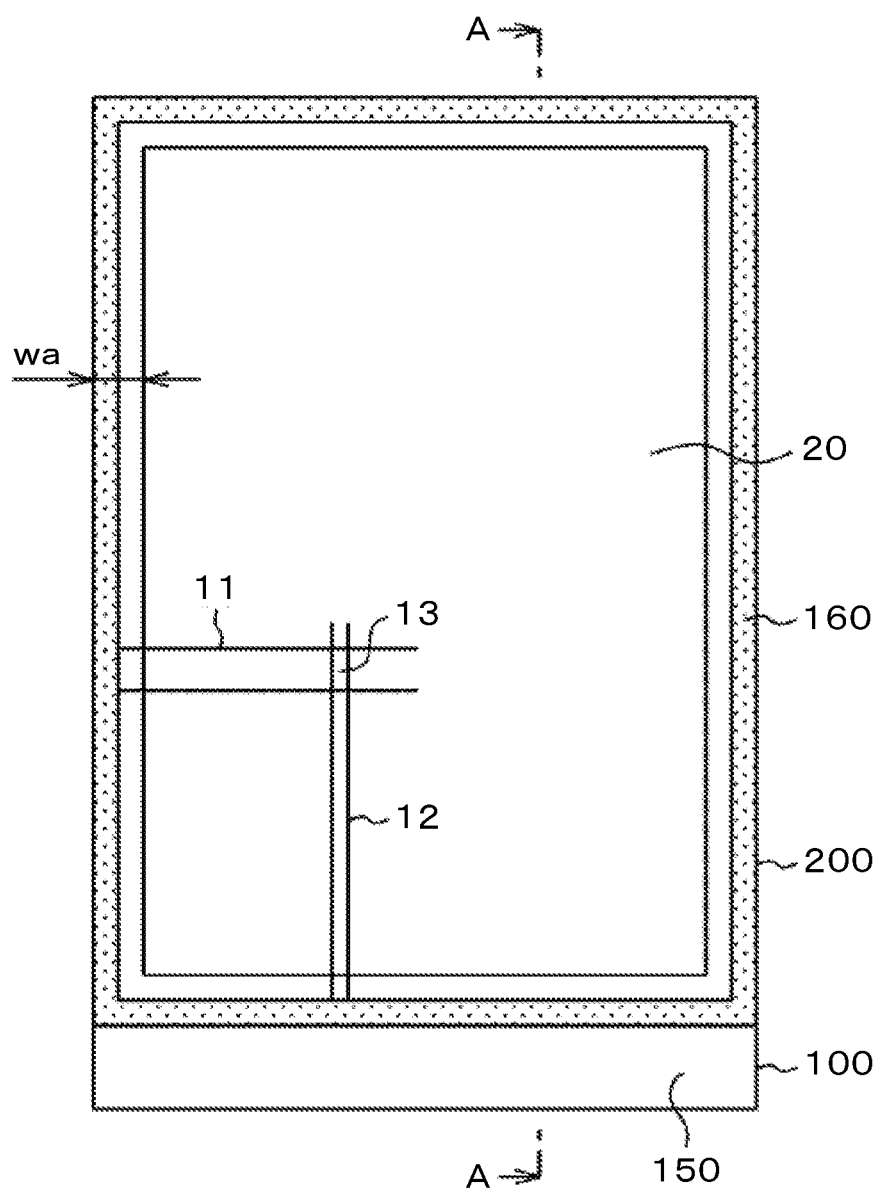
FIG. 1 is a plan view of a liquid crystal display device according to the present invention.
Figure 2:
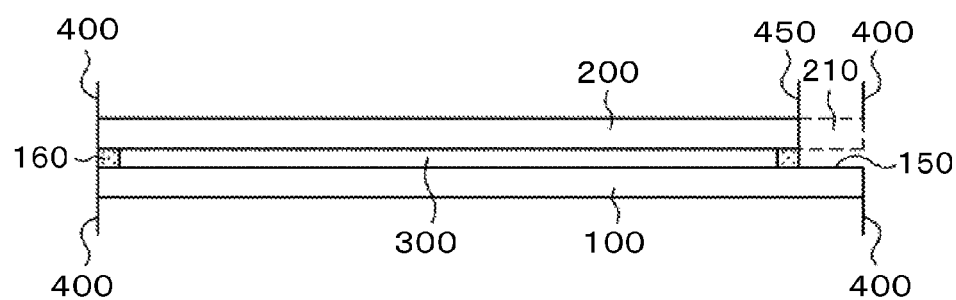
FIG. 2 is a cross-sectional view taken on line A-A in FIG. 1.

FIG. 1 is a plan view showing a typical liquid crystal display panel to which the present invention is applied, and FIG. 2 is a cross-sectional view taken on line A-A in FIG. 1. The liquid crystal display panel shown in FIG. 1 is used in a liquid crystal display device for use in a mobile phone, for example. In FIGS. 1 and 2, a TFT substrate 100 and a counter substrate 200 are bonded together by a seal material 160. The TFT substrate 100 and the counter substrate 200 have liquid crystal 300 sandwiched therebetween. The TFT substrate 100 is formed to be larger than the counter substrate 200. That portion of the TFT substrate 100 which is not overlaid with the counter substrate 200 constitutes a terminal area 150.

In FIG. 1, the periphery of a display area 20 constitutes a frame area. The seal material 160 is formed in the frame area. The liquid crystal display device such as one shown in FIG. 1 is required to have the largest possible display area 20. As a result, the width wa of the frame area is either 1 mm or less or 0.7 mm or less.

In the display area 20, scanning lines 11 extend in a first direction and are arrayed in a second direction. Video signal lines 12 extend in the second direction and are arrayed in the first direction. The regions enclosed by the scanning lines 11 and video signal lines 12 constitute pixels 13. On a higher-resolution display device, the pixels 13 are formed to be smaller. The pitch of the video signal lines 12 is as small as 30 μm or less in some cases.

In FIG. 1, the terminal area 150 where the TFT substrate 100 is not overlaid with the counter substrate 200 has terminals formed to connect with a flexible wiring substrate that supplies power and signals to the liquid crystal display panel. The terminal area 150 also has terminals for accommodating a driver integrated circuit (IC) that is connected, for example, by a chip-on-glass (COG) to drive the scanning lines 11 and video signal lines 12.

Figure 3:
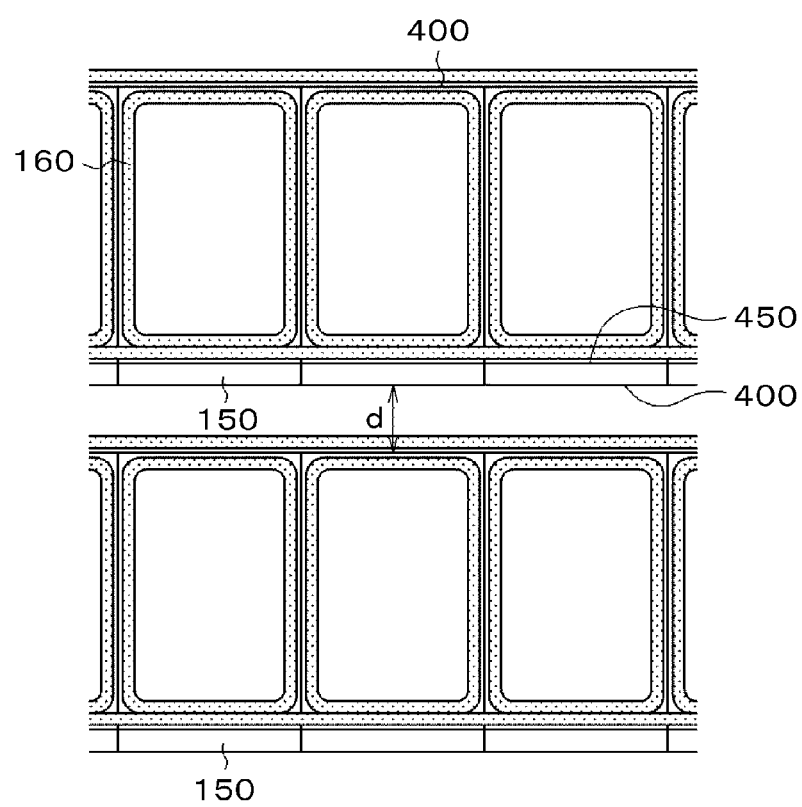
FIG. 3 is an arrangement plan showing a typical existing arrangement of liquid crystal cells on a mother substrate.

In FIG. 2, the TFT substrate 100 and the counter substrate 200 are bonded together by the seal material 160 and have the liquid crystal 300 sandwiched therebetween. That portion of the counter substrate 200 which covers the terminal area 150 of the TFT substrate 100 needs to be removed. The corresponding end portion 210 of the counter substrate 200 is thus cut off along a cleavage line 450. To remove the end portion 210, the counter substrate 200 is first scribed along the cleavage line 450. The end portion 210 is then cleaved by impact from the counter substrate 200. Meanwhile, to cleave the liquid crystal display panel from the mother substrate, the TFT substrate 100 and the counter substrate 200 are first scribed along a cleavage line 400. The liquid crystal display panel is then cleaved by impact from the mother substrate. FIG. 3 shows a typical existing arrangement of liquid crystal display panels on a mother substrate. In the description that follows, the individual liquid crystal display panels yet to be cleaved from the mother substrate may be referred to as the liquid crystal cells. In FIG. 3, the seal material 160 is applied in a manner surrounding the display area using a dispenser, for example. On the side of the terminal area 150, two portions of seal material 160 are formed. On the short side opposite the terminal area 150, a dummy seal material is formed in a manner flanking the cleavage line 400. The dummy seal material is intended to prevent the glass from getting deformed at the time of scribing so that the substrate may be scribed uniformly.

In FIG. 3, the liquid crystal cells are formed close to each other in the crosswise direction but are arranged a distance d apart in the longitudinal direction. This is to prevent the terminal area 150 from being affected by the seal material 160 or alignment film of adjacent liquid crystal cells. Numerous ITO-covered terminals are arrayed at a small pitch in the terminal area 150. Arranging the liquid crystal cells the distance d apart in the longitudinal direction prevents possible short-circuiting caused by ITO residues.

Figure 4:
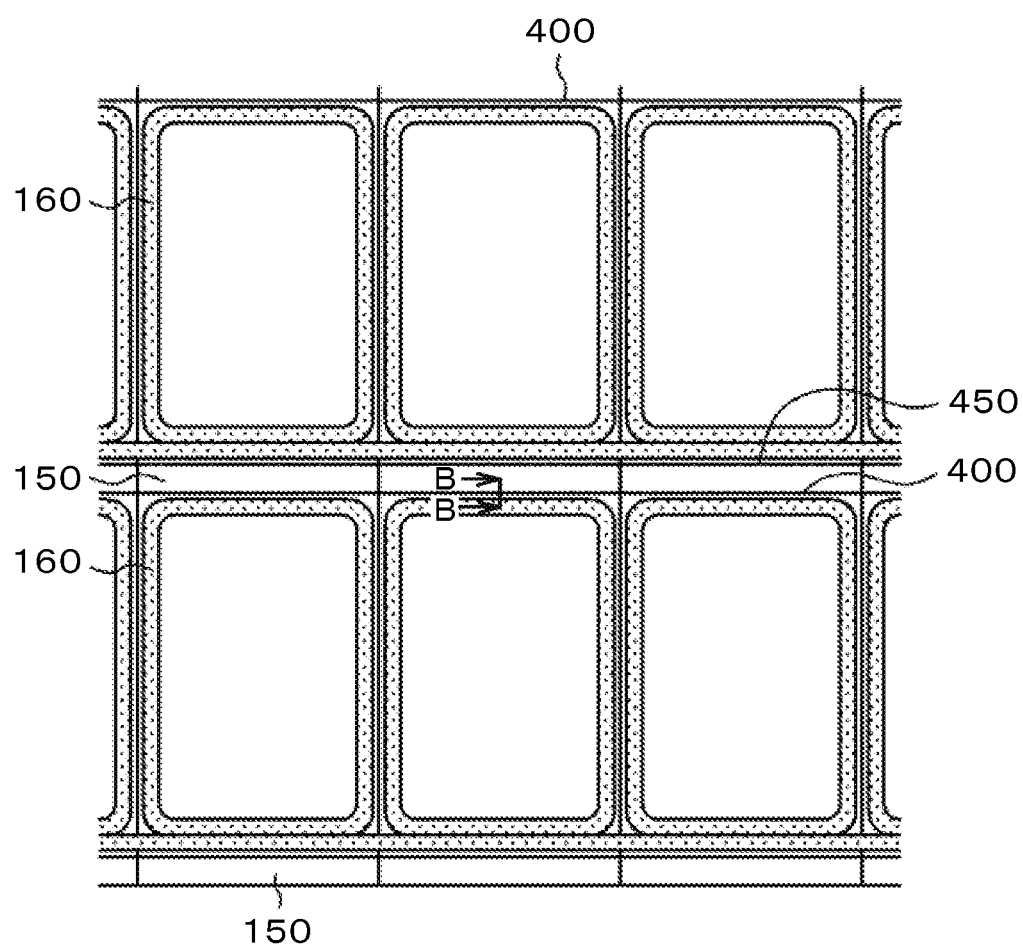
FIG. 4 is a plan view of liquid crystal cells arranged with no gap therebetween on a mother substrate.

However, the discarding of the portion d shown in FIG. 3 does not favor an increase in the number of liquid crystal cells obtained from the mother substrate. Under manufacturing cost constraints, liquid crystal cells are required to be formed with no gap therebetween in the longitudinal direction as well. FIG. 4 is a plan view of liquid crystal cells typically arranged with no gap therebetween on the mother substrate. In FIG. 4, adjacent liquid crystal cells in the terminal area 150 share the cleavage line 400. This causes the seal portion structure of the adjacent liquid crystal cells to affect the terminal area 150.

Figure 5:
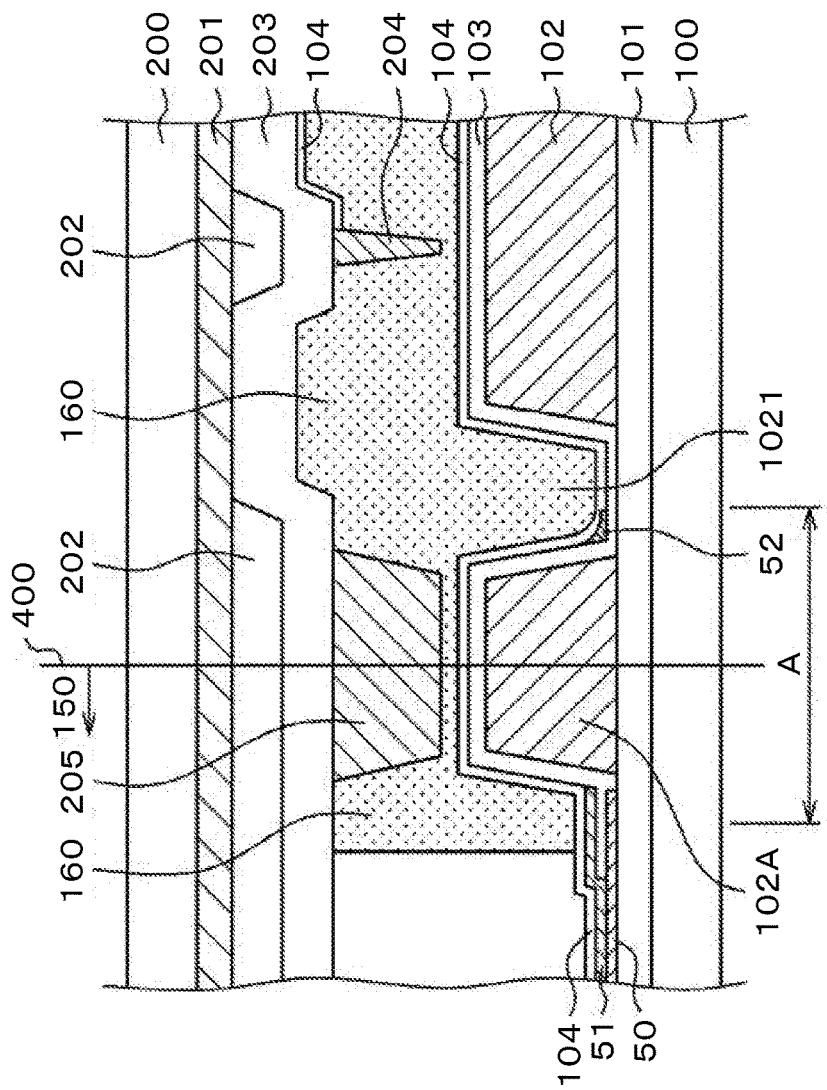
FIG. 5 is a cross-sectional view taken on line B-B in FIG. 4, showing a problem with the arrangement in FIG. 4.

FIG. 5 is a cross-sectional view taken on line B-B in FIG. 4. The terminal area 150 is to the left of the cleavage line 400. To the right of the cleavage line 400 is the seal portion of the adjacent liquid crystal cell shown downward in FIG. 4. In FIG. 5, an insulating layer 101 is formed over the TFT substrate 100. The insulating layer 101 includes a gate insulating film and an interlayer insulating film. An organic passivation film 102 is formed over the insulating layer 101. The organic passivation film 102 serves to insulate the wiring such as the scanning lines 11 or video signal lines 12 from the pixel electrodes or from a common electrode in the display area. The organic passivation film 102 is formed to be as thick as 2 to 5 μm, for example, in order to minimize the capacity coupling between the wiring on one hand and the pixel electrodes or the common electrode on the other hand.

Figure 8:
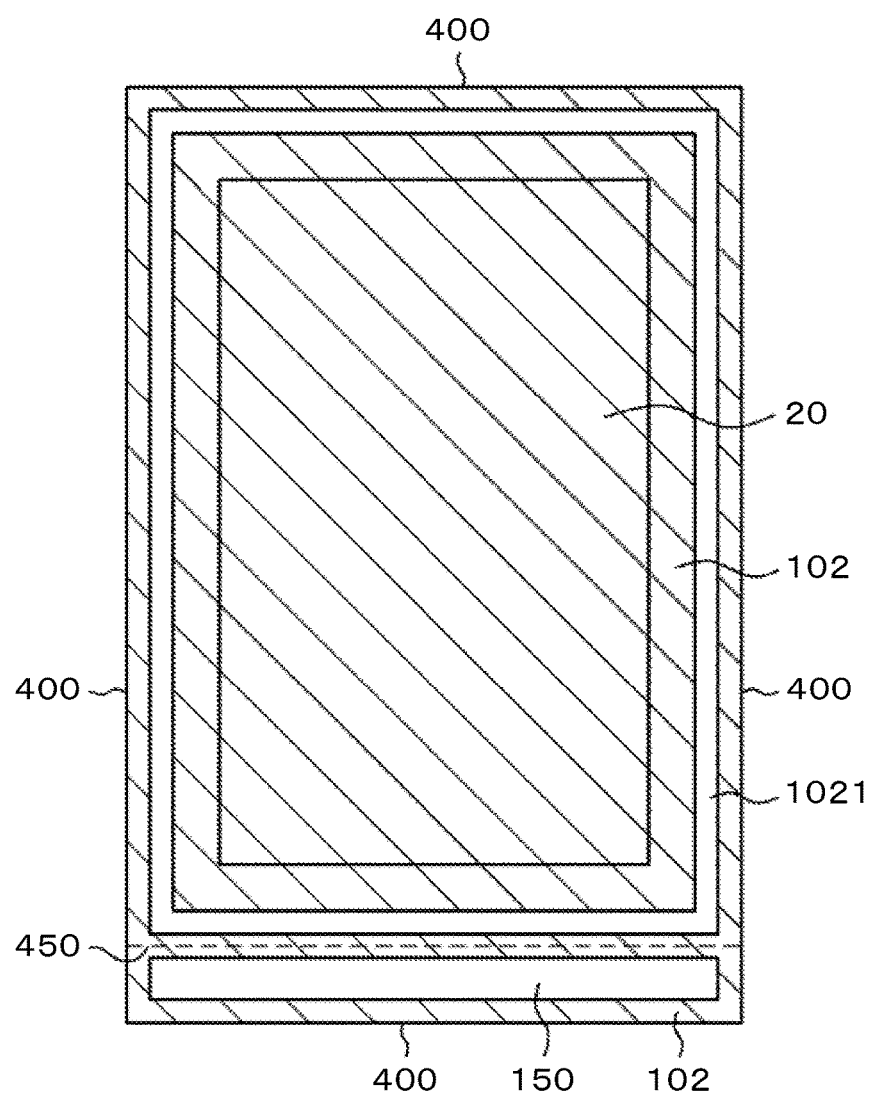
FIG. 8 is a plan view showing a range in which an organic passivation film is formed.

In a scribing portion made up of a region A in FIG. 5, the organic passivation film 102 doubles as a spacer that facilitates scribing and subsequent cleaving by impact of the liquid crystal cells. For this reason, the organic passivation film 102 is formed like a bank along the cleavage line 400. In the ensuing description, the bank-like organic passivation film along the cleavage line 400 is referred to as the organic passivation film 102A. FIG. 8 is a plan view showing a portion of the TFT substrate 100 where an organic passivation film is provided. In FIG. 8, the organic passivation film 102 is formed all over the display area 20. The organic passivation film 102A is further formed over portions corresponding to the cleavage lines 400 and 450. The cleavage line 450 in FIG. 8 is formed on the side of the counter substrate 200, so that the line 450 is shown as a broken line indicative of the putative corresponding location.

Outside the display area 20 in FIG. 8, an organic passivation film groove 1021 devoid of the organic passivation film 102 is formed in a manner surrounding the display area 20. External moisture may intrude through resins into the liquid crystal display panel. Since the organic passivation film 102 is made of a resin such as acrylic resin or silicon resin, the organic passivation film groove 1021 is provided to shield the moisture.

The terminal area 150 has no need for an organic passivation film because the area exposes the conductive parts of the terminals. However, the cleavage line 400 or 450 needs an organic passivation film as a spacer. That is why the organic passivation film 102A is formed like a frame surrounding the terminal area 150.

Returning to FIG. 5, the organic passivation film groove 1021 corresponds to the organic passivation film groove 1021 in FIG. 8. The organic passivation film 102 is not formed over the terminal area 150 except near the cleavage line 400. In FIG. 5, an inorganic insulating film 103 is formed typically with silicon nitride (SiN) over the organic passivation films 102 and 102A. In the display area, the inorganic insulating film 103 is used to insulate the pixel electrodes from the common electrode, for example.

On the side of the terminal area 150 in FIG. 5, the terminals are formed. The terminals have a terminal metal 50 formed of the same layer as that of the video signal lines for example, the metal extending from the display area side. Over the terminal metal 50, contact holes are formed in the inorganic insulating film 103. The contact holes are covered by terminal ITO 51. The ITO, being chemically stable, protects the terminal metal 50. The terminal ITO 51 may be formed at the same time that the pixel electrodes are formed in the display area.

A first problem with the structure in FIG. 5 is that when the terminal ITO 51 is patterned, ITO residues 52 tend to remain at the base of the organic passivation film 102A. That is, the organic passivation film 102 or 102A is as thick as about 3 μm, so that the base of the bank-like organic passivation film 102A is not fully exposed or not fully invaded by an etching solution. That is why the ITO residues 52 can remain at the base of the bank-like organic passivation film 102A.

Figure 6:
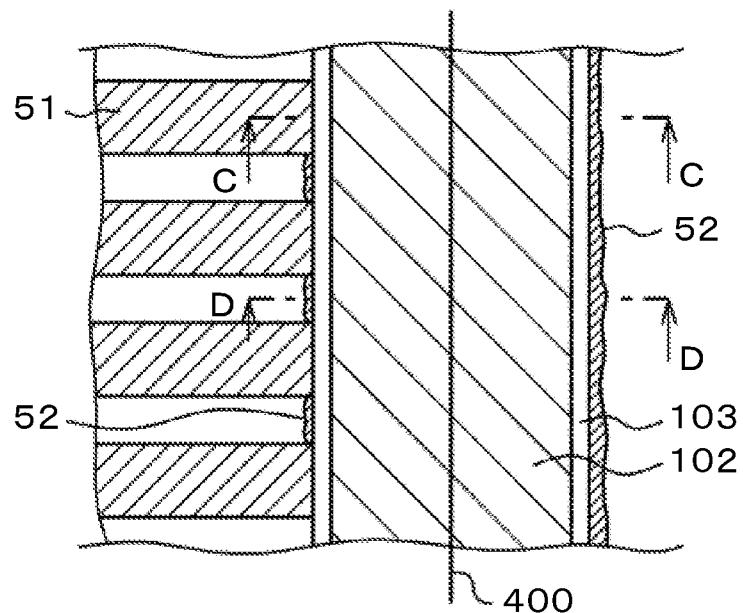
FIG. 6 is a plan view of the portion of a TFT substrate which corresponds to a region A in FIG. 5.

The ITO residues 52, if they occur, can lead to the problem of short-circuiting between terminals. FIG. 6 is a plan view of the portion of the TFT substrate 100 which corresponds to the region A in FIG. 5. The region A in FIG. 5 corresponds to a cross-section taken on line C-C in FIG. 6. In FIG. 6, the terminal ITO 51 constituting the terminals is formed up to the base of the bank-like organic passivation film 102A. The ITO residues 52 remain at the base of the bank-like organic passivation film 102A on the side of the seal portion opposite the terminals.

Figure 7:
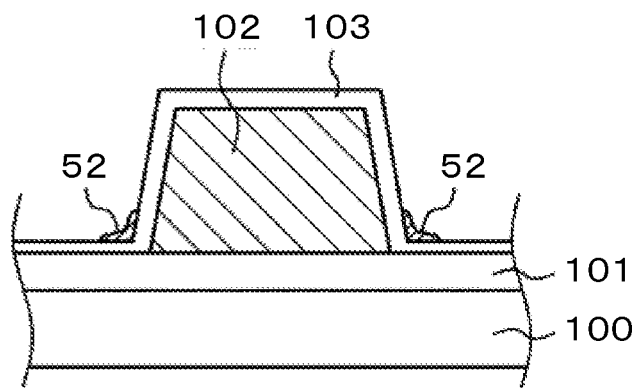
FIG. 7 is a cross-sectional view taken on line D-D in FIG. 6.

The presence of the ITO residues 52 causes the serious problem of short-circuiting between terminals as shown in FIG. 6. FIG. 7 is a cross-sectional view taken on line D-D in FIG. 6. In FIG. 7, the ITO residues 52 are at the base of the bank-like organic passivation film 102A. Short-circuits between the terminals are caused by the ITO residues 52 on the left side of the bank-like organic passivation film 102A in FIG. 7.

The problem of short-circuiting caused by the ITO residues 52 is resolved, for example, by forming the terminals at a sufficient distance from the bank-like organic passivation film 102A provided that the terminal area has a large planar dimension. However, attempts at increasing the planar dimension of the display area and reducing the external size of the liquid crystal display panel result in an insufficient planar dimension of the terminal area.

In the display area, meanwhile, an alignment film 104 is provided for initial alignment of the liquid crystal after the pixel electrodes are formed. The alignment film 104 is initially a liquid applied by flexographic printing or by ink jet printing. After being applied, the liquid alignment film material is in flux. That means the alignment film material can flow into the terminal areas of other liquid crystal cells on the mother substrate if stoppers are not appropriately provided.

FIG. 5 illustrates the above-mentioned problem. In the seal portion of an adjacent liquid crystal cell in FIG. 5, the alignment film 104 of the liquid crystal cell on the right is not stopped by the bank-like organic passivation film 102A and flows onto terminals of the adjacent liquid crystal cell on the left. The alignment film 104 is burned at about 200° C. to become an insulating film. The alignment film 104 present on the terminals triggers bad continuity. Thus the inflow of the alignment film 104 from the adjacent liquid crystal cell must be inhibited.

In FIG. 5, the counter substrate 200 is disposed opposite the TFT substrate 100. A black matrix 201 is formed over the counter substrate 200. A color filter 202 is formed over the black matrix 201. In the seal portion, the color filter 202 is used to adjust the gap between the TFT substrate 100 and the counter substrate 200. For example, a blue color filter is used as the color filter 202. An overcoat film 203 is formed to cover the color filter 202 and the black matrix 201.

In FIG. 5, a wall-like spacer 204 is formed over the overcoat film 203. Besides determining the gap between the TFT substrate 100 and the counter substrate 200, the wall-like spacer 204 serves to prevent the alignment film 104 on the side of the counter substrate 200 from flowing to the liquid crystal cell edge. A bank-like spacer 205 is formed corresponding to the cleavage line 400 along the boundary between the liquid crystal cells. In the display area, the wall-like spacers 204 and bank-like spacers 205 are formed in the same process for forming columnar spacers that determine the gap between the TFT substrate 100 and the counter substrate 200.

In FIG. 5, the TFT substrate 100 and the counter substrate 200 are bonded together by the seal material 160. While it is preferred that the seal material 160 exist only in the seal portion, the seal material 160 flows through a gap between the bank-like spacer 205 and the bank-like organic passivation film 102A and out to the terminal area of the adjacent liquid crystal cell. The outflow of the seal material 160 is not a serious problem if the planar dimension of the terminals is large enough. If the planar dimension of the terminals is made smaller given a higher resolution of the display, the outflow of the seal material 160 can cause bad continuity.

When the liquid crystal cells are arranged with no gap therebetween on the mother substrate as described above, the terminal area is subject to the problems of short-circuiting of terminals caused by the ITO residues 52, bad continuity of terminals due to the outflow of the alignment film 104 to adjacent liquid crystal cells, and bad continuity of terminals caused by the outflow of the seal material 160 to adjacent liquid crystal cells.

Figure 9:
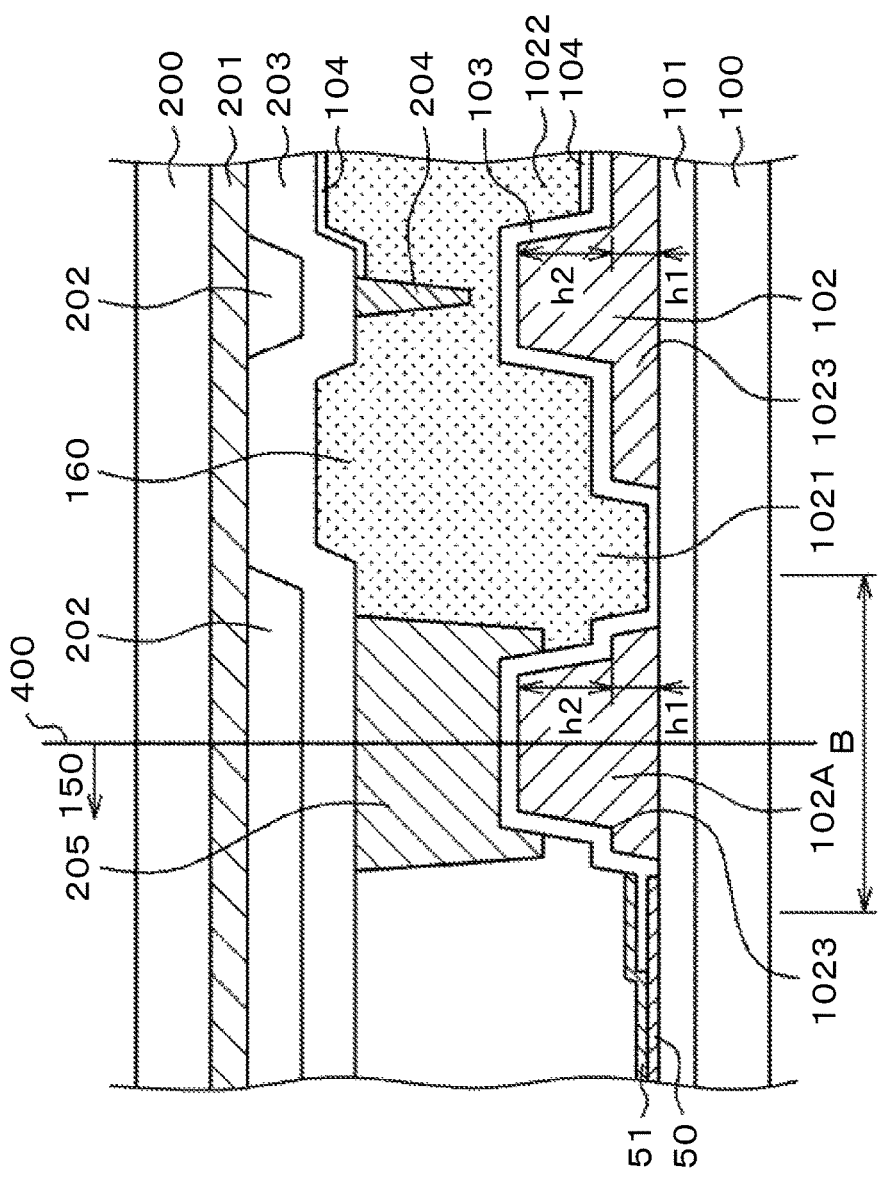
FIG. 9 is a cross-sectional view of an embodiment of the present invention, corresponding to the cross-sectional view taken on line B-B in FIG. 4.

FIG. 9 is a cross-sectional view showing a structure of an embodiment of the present invention designed to solve such problems. FIG. 9 corresponds to the cross-sectional view taken on line B-B in FIG. 4. In FIG. 9, the insulating layer 101 is formed over the TFT substrate 100. The organic passivation films 102 and 102A are formed over the insulating layer 101. The role of the organic passivation films 102 and 102A is the same as that explained above in reference to FIG. 5. One characteristic of the structure in FIG. 9 is that the bank-like organic passivation film 102A in the portion corresponding to the cleavage line 400 has a stepped part 1023. The height h1 from the bottom of the bank-like organic passivation film 102A to the stepped part 1023 is 1 μm, for example. The height h2 from the stepped part 1023 to the top of the bank-like organic passivation film 102A is 2 μm, for example.

The ITO residues 52 grow precipitously when the groove depth of the bank-like organic passivation film 102A exceeds 2 μm. In FIG. 9, the bank-like organic passivation film 102A has the stepped part 1023, so that the organic passivation film groove 1021 has stepped depths of 2 μm and 1 μm. Each of these depths is not conducive to incurring the ITO residues 52. Thus as opposed to the structure of FIG. 5, the structure of FIG. 9 prevents short-circuiting of the terminal ITO 51.

Figure 10:
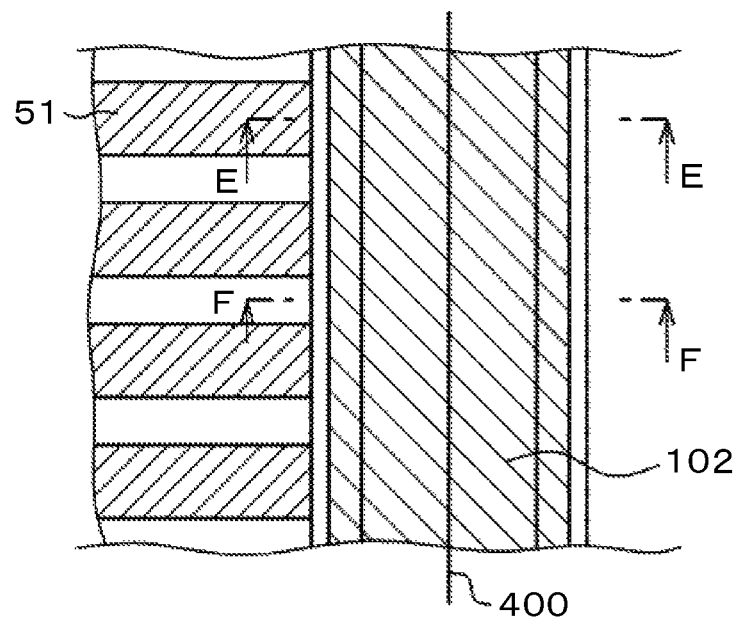
FIG. 10 is a plan view of the portion of the TFT substrate which corresponds to a region B in FIG. 9.
Figure 11:
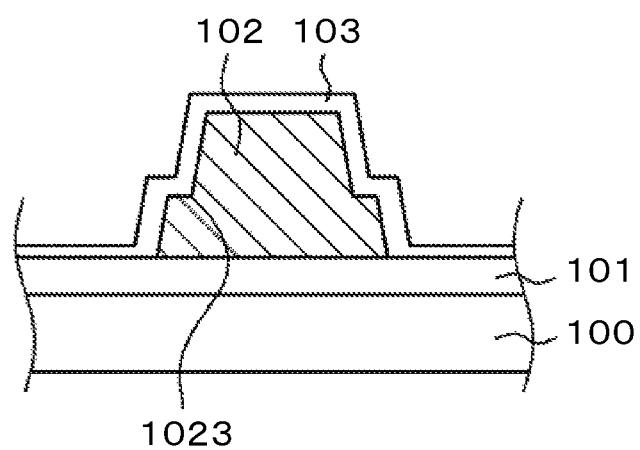
FIG. 11 is a cross-sectional view taken on line F-F in FIG. 10.

FIG. 10 is a plan view of the portion of the TFT substrate 100 which corresponds to a region B in FIG. 9. The region B on the side of the TFT substrate 100 in FIG. 9 corresponds to a cross-section taken on line E-E in FIG. 10. As shown in FIGS. 9 and 10, there are no ITO residues at the stepped part 1023 or at the base of the bank-like organic passivation film 102A. FIG. 11 is a cross-sectional view taken on line F-F in FIG. 10. As shown in FIGS. 10 and 11, there are no ITO residues at any stepped part 1023 of the bank-like organic passivation film 102A or at its base. Thus the terminal ITO 51 is not short-circuited by ITO residues.

Another characteristic of the structure in FIG. 9 is that a recessed part is formed at the tip of the bank-like spacer 205, with the tip of the bank-like organic passivation film 102A inserted in the recessed part. In other words, the tip of the bank-like organic passivation film 102A is opposed to the recessed part of the bank-like spacer 205. Where the tip of the bank-like organic passivation film 102A is inserted in the recessed part of the bank-like spacer 205 in this manner, the structure helps prevent the seal material 160 from flowing out to the terminal area of adjacent liquid crystal cells. This makes it possible to avoid the phenomenon in which the seal material 160 flowing out to cover terminals of an adjacent liquid crystal cell triggers bad continuity. The recessed part shown in FIG. 9 is formed as a groove so that the bank-like organic passivation film 102A may be inserted therein.

A further characteristic of the structure in FIG. 9 is that a second organic passivation film groove 1022 is formed further inside the organic passivation film groove 1021, thereby forming a second bank-like organic passivation film 102. The depth h2 of the second organic passivation film groove 1022 is less than that of the first organic passivation film groove 1021. For example, the depth h2 is 2 μm. That means the bottom of the second organic passivation film groove 1022 is constituted not by the insulating layer 101 but by the organic passivation film 102.

As shown in FIG. 9, the second bank-like organic passivation film 102 resulting from the second organic passivation film groove 1022 prevents the flow of the alignment film. Even if the second bank-like organic passivation film 102 fails to stop the flowing alignment film, the first bank-like organic passivation film 102 serves to stop the flow of the alignment film 104.

Figure 12:
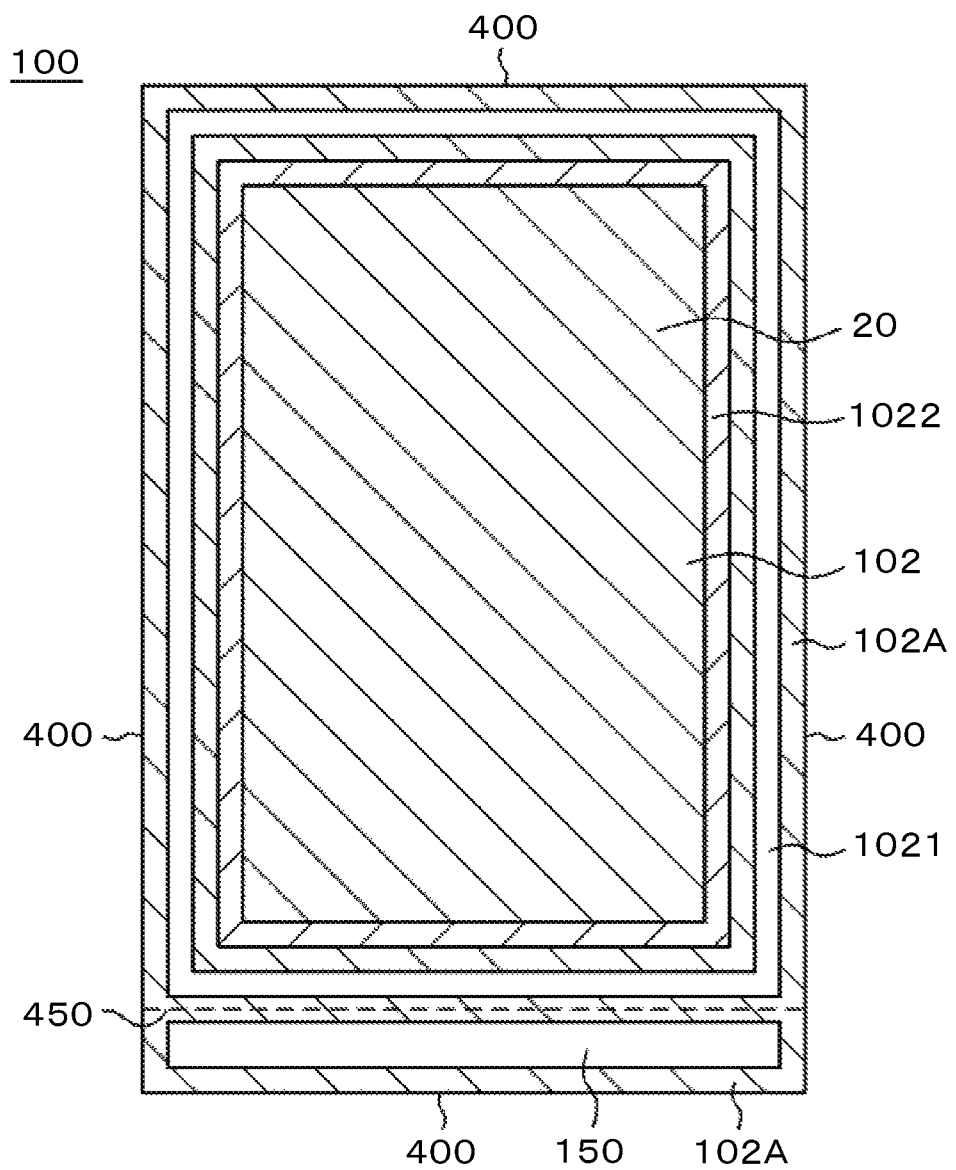
FIG. 12 is a plan view showing a range in which an organic passivation film is formed in the embodiment.

FIG. 12 is a plan view showing how the organic passivation film 102 is shaped over the TFT substrate 100. The basic planar structure of the organic passivation film 102 is the same as explained above in reference to FIG. 8. What makes the structure of FIG. 12 different from that of FIG. 8 is that the second organic passivation film groove 1022 is formed inside the organic passivation film groove 1021, i.e., on the side of the display area 20.

The depth of the second organic passivation film groove 1022 is represented by h2 as shown in FIG. 9, the depth h2 being 2 μm for example. The depth of the first organic passivation film groove 1021 is defined as h1+h2, the depth h1+h2 being 3 μm for example. That means the first organic passivation film groove 1021 is better at stopping the flowing alignment film 104. Nevertheless, with this invention, the second organic passivation film groove 1022 is added to increase the odds of stopping the flow of the alignment film 104.

In FIG. 9, the groove depths have a relationship defined as h2>h1, or h1<(h1+h2)/2. This structure further improves the effect of the second organic passivation film groove 1022 in stopping the flow of the alignment film 104.

Figure 13:
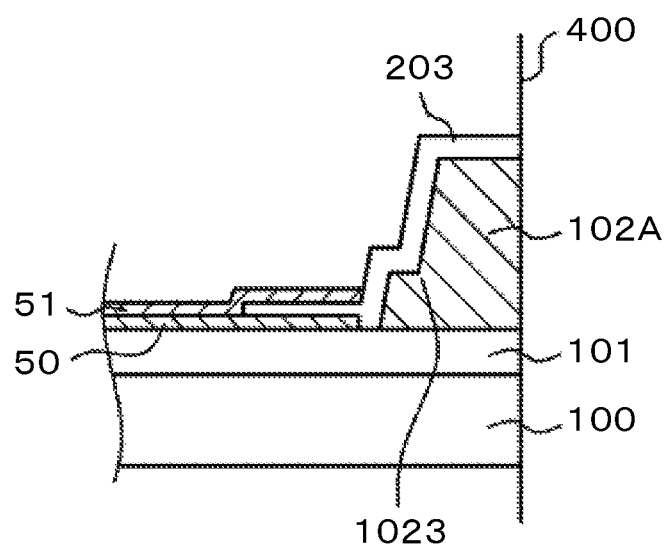
FIG. 13 is a cross-sectional view of the terminal area of a liquid crystal display panel cleaved along a cleavage line from the mother substrate shown in FIG. 9.
Figure 14:
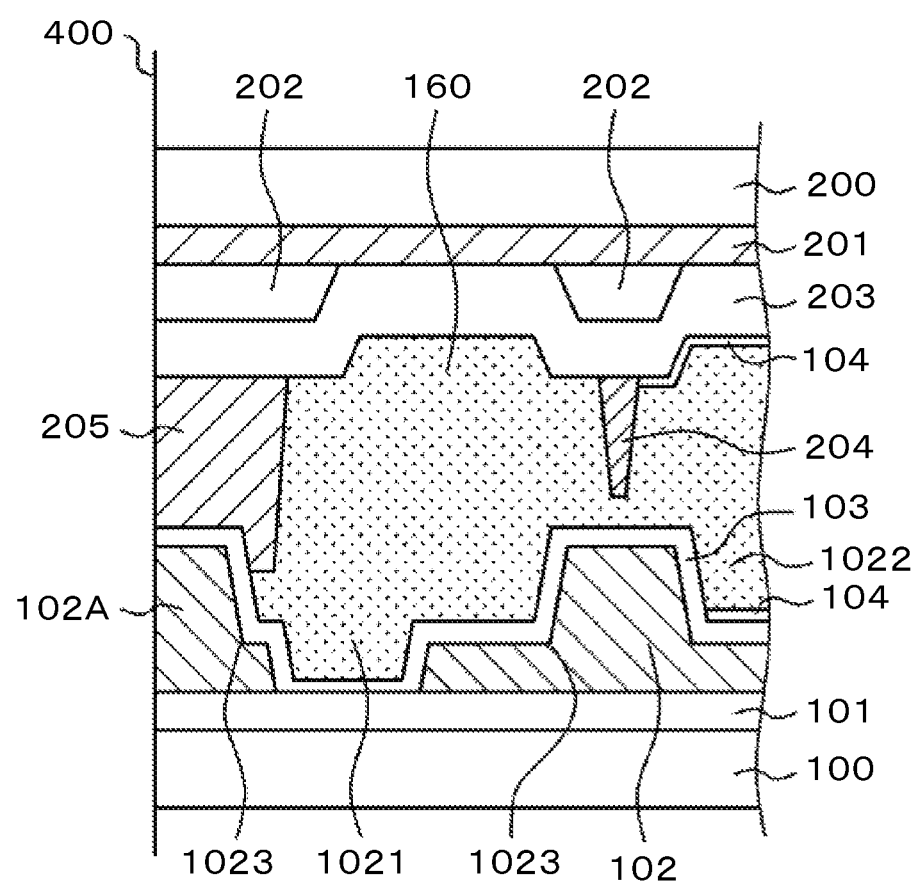
FIG. 14 is a cross-sectional view of the seal portion of a liquid crystal display panel cleaved along a cleavage line from the mother substrate shown in FIG. 9.

FIG. 13 is a cross-sectional view of the terminal area of a first liquid crystal cell cleaved along the cleavage line 400 from among adjacent liquid crystal cells on the mother substrate, and FIG. 14 is a cross-sectional view of the seal portion of a second liquid crystal cell adjacent to the first liquid crystal cell. FIG. 13 thus gives a cross-sectional view of the terminal area of the first liquid crystal cell. In FIG. 13, the portion on the counter substrate side is discarded as the end portion 210 shown in FIG. 2, so that only the structure on the side of the TFT substrate 100 remains.

In FIG. 13, the insulating layer 101 is formed over the TFT substrate 100. Over the insulating layer 101, there remains one side of the bank-like organic passivation film 102A having the stepped part 1023. In FIG. 13, no ITO residues are left at the base of the bank-like organic passivation film 102. Thus there is no risk of the terminals being short-circuited by ITO residues. There is neither the outflow of the seal material to the terminals nor the inflow of the alignment film to the terminals, so that bad connection of the terminals is averted.

FIG. 14 is a cross-sectional view of the seal portion of the second liquid crystal cell adjacent to the first liquid crystal cell. In FIG. 14, the bank-like spacer 205 and the bank-like organic passivation film 102A are each bisected along the cleavage line 400. In other words, inside the structure of FIG. 14, the bank-like spacer 205 has a first part and a second part. The second part is at the edge and thicker than the first part. The tip of the bank-like organic passivation film 102A is opposed to the first part of the bank-like spacer 205.

The other structures are the same as described above in reference to FIG. 9. With the liquid crystal cells arranged contiguously with no gaps therebetween on the mother substrate as described above according to this invention, it is still possible to avoid bad connection of the terminals caused by the seal portion of an adjacent liquid crystal cell and to avert short-circuiting of the terminals brought about by ITO residues.

Figure 15:
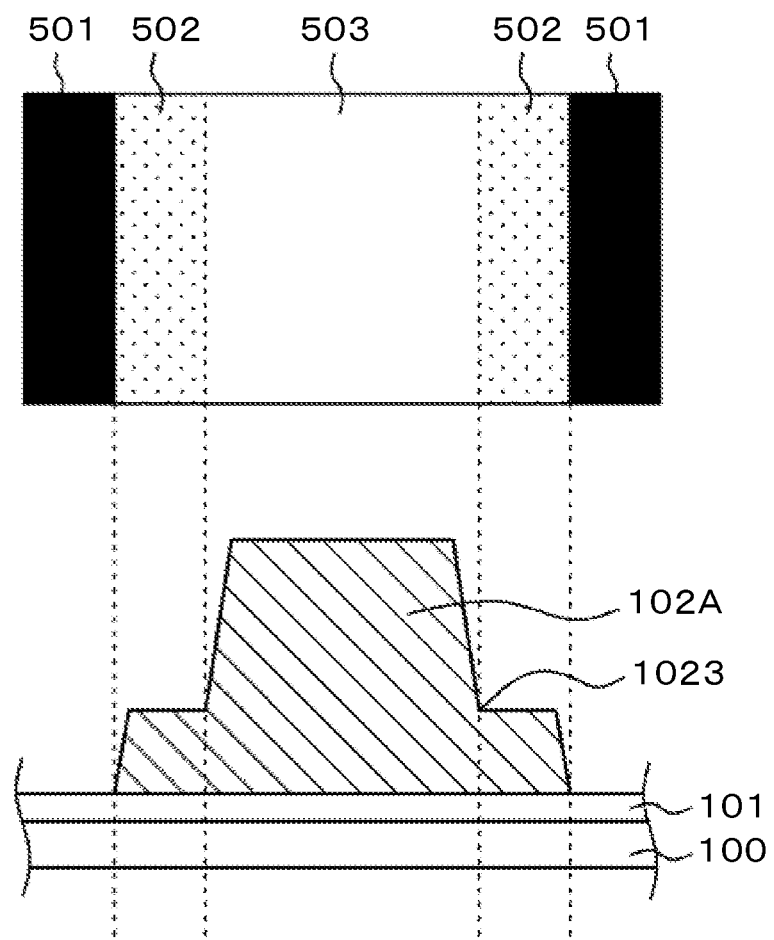
FIG. 15 is a schematic cross-sectional view showing how a bank-like organic passivation film is stepped.

FIG. 15 is a schematic cross-sectional view showing how the stepped part 1023 is formed on the bank-like organic passivation film 102A in FIG. 9. A photosensitive resin is used to form the organic passivation film 102A. Those parts of the photosensitive film which are exposed to light are hardened; those parts not exposed to light are removed using a developing solution.

In FIG. 15, the stepped part 1023 of the bank-like organic passivation film 102A is formed by half-exposure. The height of the stepped part 1023 is controlled by adjusting the light intensity of half-exposure. That is, the part of the organic passivation film desired to be left intact as the bank-like organic passivation film 102A is fully exposed through a transmissive region 503 of the mask. The part of the organic passivation film desired to be removed is aligned with shielding regions 501 of the mask. A thinned portion contiguous with the stepped part 1023 of the organic passivation film is formed by exposure through half-tone regions 502 of the mask.

Figure 16:
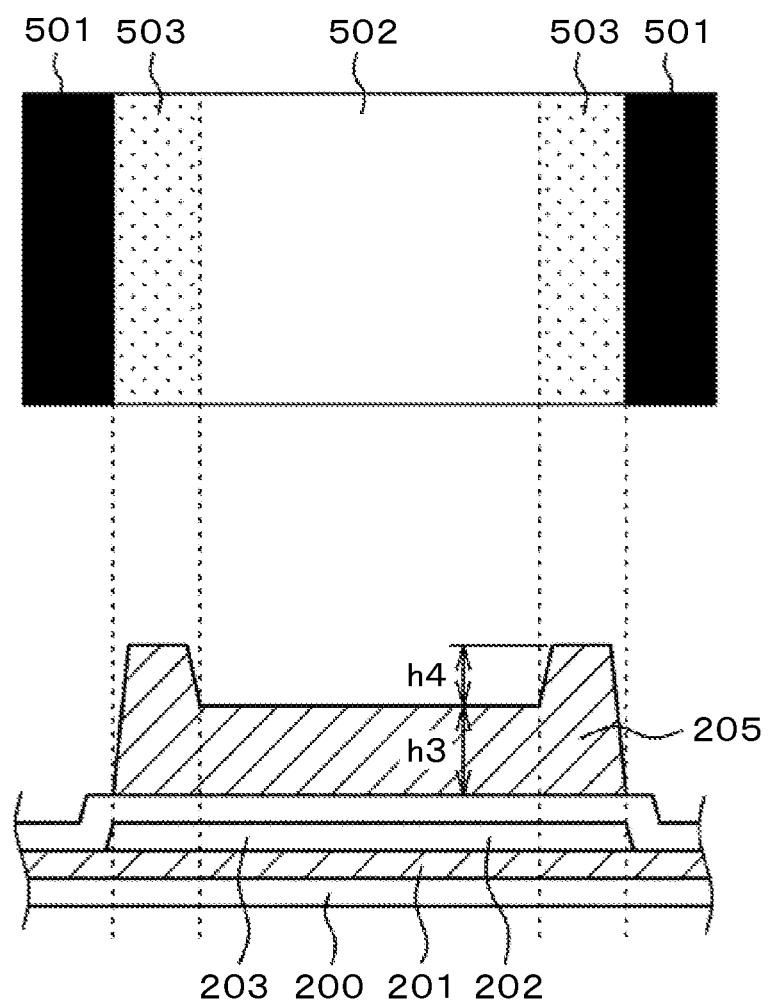
FIG. 16 is a schematic cross-sectional view showing how a recessed part is formed in a bank-like spacer.

FIG. 16 is a schematic cross-sectional view showing how the bank-like spacer 205 with the recessed part is formed on the counter substrate 200. The recessed part of the bank-like spacer 205 is formed using half-exposure technology as well. The bank-like spacer 205 is made of a photosensitive acrylic resin, for example. In FIG. 16, the thick portions on both sides of the bank-like spacer 205 are fully exposed through transmissive regions 503 of the mask. Those portions of the bank-like spacer 205 which are desired to be removed are aligned with the shielding regions 501 of the mask. That part of the bank-like spacer 205 set to be recessed to a desired depth is aligned with the half-tone regions 502 of the mask upon exposure. In FIG. 16, the depth h4 of the recessed part in the bank-like spacer 205 or the thickness h3 of the bank-like spacer 205 in the recessed part is controlled by adjusting the exposure intensity of half-exposure.

Figure 17:
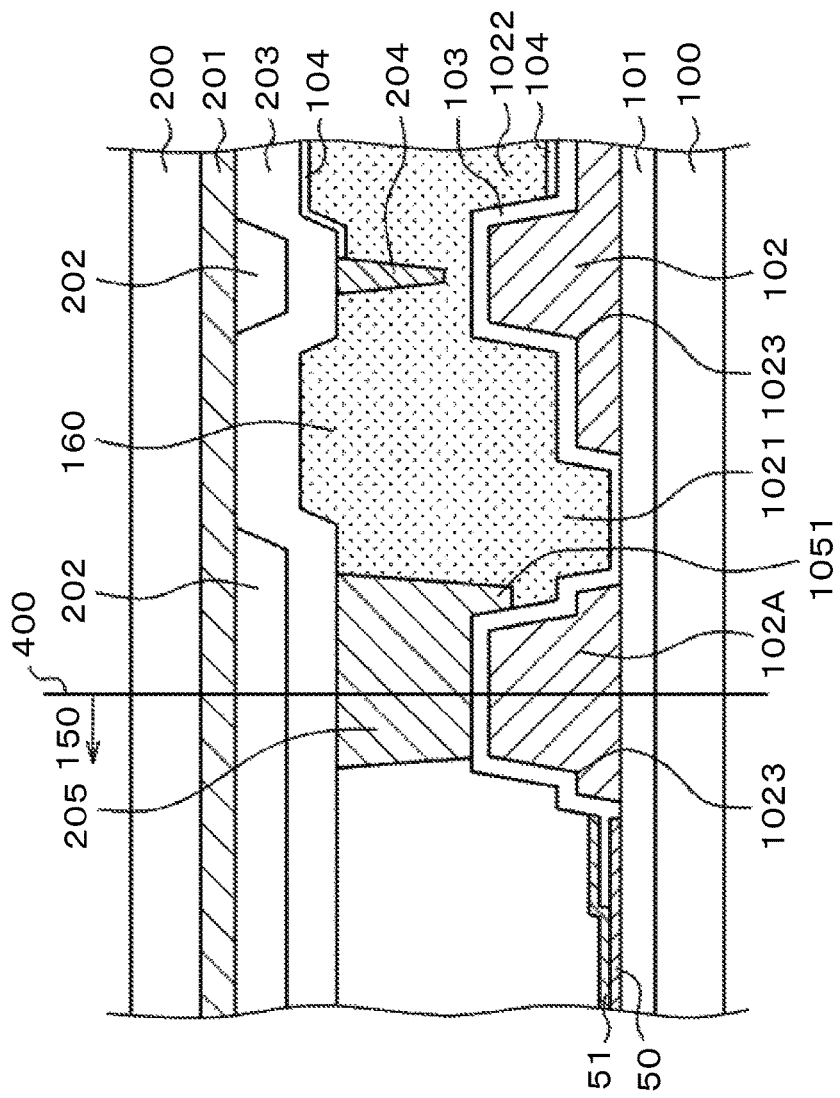
FIG. 17 is a cross-sectional view showing another embodiment of the present invention.

FIG. 17 is a cross-sectional view showing a structure of another embodiment of the present invention. The purpose of inserting the bank-like organic passivation film 102A into the recessed part of the bank-like spacer 205 is to prevent the seal material 160 from flowing out to the terminal area side. In order to achieve this purpose, an edge part 2051 of the bank-like spacer 205 need only be on either side of the bank-like organic passivation film 102A and not on both sides. FIG. 16 shows how the edge part 2051 of the bank-like spacer 205 is formed only on the side of the seal portion, the edge part being omitted on the terminal side.

The above structure eliminates the need for inserting the bank-like organic passivation film 102A into the recessed part of the bank-like spacer 205. This provides the advantage of easily aligning the TFT substrate 100 with the counter substrate 200. The other structures in FIG. 17 are the same as described above in reference to FIG. 9.

Figure 18:
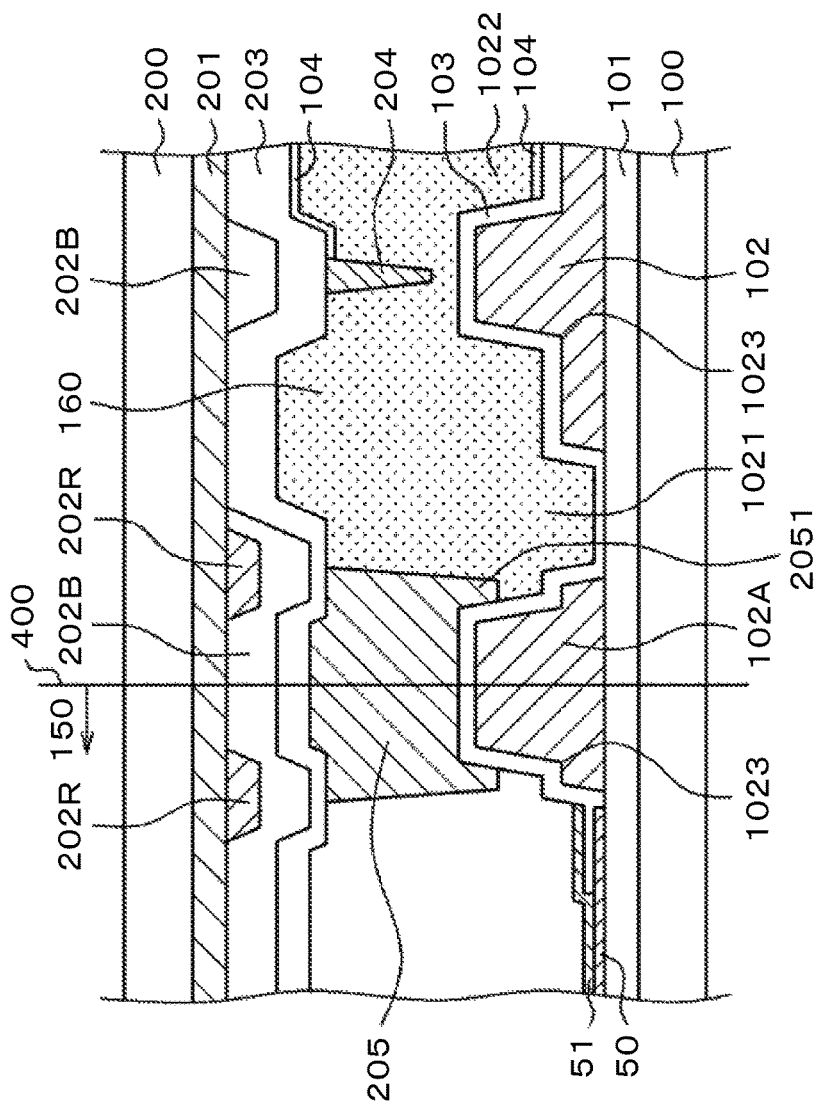
FIG. 18 is a cross-sectional view showing still another embodiment of the present invention.

FIG. 18 is a cross-sectional view showing a structure of still another embodiment of the present invention. What makes the structure of FIG. 18 different from that of FIG. 9 is that there are two layers of color filters for adjusting the height of the bank-like spacer 205. Specifically, a red color filter 202R is disposed corresponding to the edge part 2051 of the bank-like spacer 205. In the edge part 2051, a blue color filter 202B is overlaid with the red color filter 202R. In the remaining parts of the bank-like spacer 205, only the blue color filter 202B is disposed.

That is, the edge part 2051 of the bank-like spacer 205 has an elevated base. This makes it easier to form a height difference between the edge part and the recessed part. In other words, the proportion of relying on half-exposure to form the recessed part of the bank-like spacer 205 is reduced, with the tolerance of the process conditions for half-exposure raised by that much. The other structures in FIG. 18 are the same as described above in reference to FIG. 9.

The structures in FIGS. 17 and 18 provide the same advantageous effects as the structure in FIG. 9.

What is claimed is:

1. A liquid crystal display device comprising a thin-film transistor substrate known as a TFT substrate and a counter substrate, the TFT substrate and the counter substrate being bonded together by a seal portion formed along the periphery of the counter substrate, the TFT substrate having a terminal area formed in a portion thereof not opposed to the counter substrate;
    wherein the TFT substrate has an organic passivation film, the organic passivation film is formed in a bank shape along an edge part thereof where the terminal area is formed;
    wherein at least one stepped part is formed over a side surface of the organic passivation film on a side of the terminal area; and
    wherein, when a film thickness from the base of the organic passivation film to the stepped part thereof is represented by h1 and when a film thickness from the stepped part to a top of the organic passivation film is represented by h2, the film thicknesses have a relationship defined as h2>h1.

2. The liquid crystal display device according to claim 1, wherein the terminal area has terminals formed therein, the terminals not having the organic passivation film formed thereon.

3. A liquid crystal display device comprising a thin-film transistor substrate known as a TFT substrate having a first organic passivation film and a second organic passivation film and a counter substrate, the TFT substrate and the counter substrate being bonded together by a seal portion formed along the periphery of the counter substrate, the TFT substrate having a terminal area formed in a portion thereof not opposed to the counter substrate, the seal portion surrounding a region constituting a display area;
    wherein the TFT substrate has the first organic passivation film formed in a bank shape along an edge part of the TFT substrate on the opposite side of the portion where the terminal area is formed, the second passivation film is formed in the display area side with a first groove interposed between the first passivation film and the second passivation film;
    wherein at least one stepped part is formed over a side surface of the first organic passivation film on a side of the display area; and
    wherein the counter substrate has a first spacer formed at a position thereof corresponding to the first organic passivation film, the tip of the first organic passivation film opposes to the first spacer.

4. The liquid crystal display device according to claim 3, wherein, when a film thickness from a base of the first organic passivation film to the stepped part thereof is represented by h1 and when a film thickness from the stepped part to a top of the first organic passivation film is represented by h2, the film thicknesses have a relationship defined as h2>h1.

5. The liquid crystal display device according to claim 3, wherein the first spacer is partially in contact with a portion ranging from a top of the first organic passivation film to a part of the side surface thereof.

6. The liquid crystal display device according to claim 3, wherein a second groove is formed in the second organic passivation film.

7. The liquid crystal display device according to claim 3, wherein, when a film thickness from the base of the second organic passivation film to the base of the second groove thereof is represented by h1 and when a film thickness from the base of the second groove to a top of the second organic passivation film is represented by h2, the film thicknesses have a relationship defined as h2>h1.

8. The liquid crystal display device according to claim 3, wherein the counter substrate has a second spacer formed at a position thereof opposed to the second organic passivation film.

9. The liquid crystal display device according to claim 3, wherein a first color filter layer is formed between the first spacer and the counter substrate, and between the second spacer and the counter substrate.

10. The liquid crystal display device according to claim 9, wherein a second color filter layer is further formed between the second spacer and the counter substrate.

11. A mother substrate comprising a thin-film transistor substrate known as a TFT substrate and a counter substrate, the TFT substrate and the counter substrate being bonded together by a plurality of seal portions each formed for a display area to constitute a plurality of liquid crystal cells;

wherein the TFT substrate has a bank-like first organic passivation film formed along an edge region of each of the liquid crystal cells and a second organic insulating film formed within the display area of each of the liquid crystal cells;

wherein a first groove is formed between the first organic passivation film and the second organic passivation film in a manner surrounding the second organic passivation film;

wherein the first organic passivation film has a second groove formed for each liquid crystal cell as an open region for a terminal area;

wherein the portions of the first organic passivation film corresponding to the first groove and the second groove constitute cleavage regions from which each liquid crystal cell is cleaved; and wherein the portions of the counter substrate corresponding to the cleavage regions have spacers formed thereon in contact with the first organic passivation film.

* * * * *